United States Patent
Ubben et al.

(10) Patent No.: US 10,027,118 B2
(45) Date of Patent: Jul. 17, 2018

(54) SYSTEM AND METHOD FOR BALANCING REACTIVE POWER LOADING BETWEEN RENEWABLE ENERGY POWER SYSTEMS

(71) Applicant: General Electric Company, Schenectady, NY (US)

(72) Inventors: Enno Ubben, Steinfurt (DE); Alfredo Sebastian Achilles, Niskayuna, NY (US); Mark Edward Cardinal, Altamont, NY (US); Rajni Kant Burra, Clifton Park, NY (US); Matthew Paul Richwine, Saratoga Springs, NY (US); Patrick Djan-Sampson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 15/158,746

(22) Filed: May 19, 2016

(65) Prior Publication Data
US 2017/0338652 A1    Nov. 23, 2017

(51) Int. Cl.
*H02J 1/00* (2006.01)
*H02J 3/18* (2006.01)
*H02J 3/38* (2006.01)

(52) U.S. Cl.
CPC ............... *H02J 3/18* (2013.01); *H02J 3/383* (2013.01); *H02J 3/386* (2013.01)

(58) Field of Classification Search
CPC ........................................................ H02J 3/18
See application file for complete search history.

(56) References Cited

U.S. PATENT DOCUMENTS 6,188,205 B1    2/2001   Tanimoto et al.
7,224,081 B2    5/2007   Larsen
(Continued)

FOREIGN PATENT DOCUMENTS

EP    2482421 A1    8/2012
JP    2007037347 A    2/2007
(Continued)

OTHER PUBLICATIONS

International Search Report dated Sep. 1, 2017.

*Primary Examiner* — Jared Fureman
*Assistant Examiner* — Duc M Pham
(74) *Attorney, Agent, or Firm* — Dority & Manning, P.A.

(57) ABSTRACT

The present disclosure is directed to a system and method for balancing reactive power loading between multiple renewable energy power systems coupled to a power grid at a point of regulation (POR). The method includes determining a voltage error based on a voltage reference and a measured voltage at the POR. The method also includes measuring at least one operating condition from each of the power systems. Further, the method includes determining a per unit actual reactive power for each of the power systems based on at least one of the actual operating conditions and determining a per unit average reactive power from the power systems based on at least one of the actual operating conditions. Thus, the method also includes determining a voltage reference command for each of the power systems as a function of the voltage error, the per unit reactive power, and/or the per unit average reactive power.

20 Claims, 10 Drawing Sheets

(56) References Cited

U.S. PATENT DOCUMENTS

| | | |
|---|---|---|
| 7,531,911 B2 | 5/2009 | Rivas et al. |
| 7,606,638 B2 | 10/2009 | Fortmann et al. |
| 7,638,893 B2 | 12/2009 | Wobben |
| 7,808,126 B2 * | 10/2010 | Stiesdal ................ H02J 3/1835 |
| | | 307/57 |
| 7,839,024 B2 | 11/2010 | Cardinal et al. |
| 7,840,312 B2 | 11/2010 | Altemark et al. |
| 7,923,862 B2 | 4/2011 | Cardinal et al. |
| 8,041,465 B2 | 10/2011 | Larsen et al. |
| 8,049,352 B2 | 11/2011 | Jorgensen et al. |
| 8,058,753 B2 | 11/2011 | Achilles et al. |
| 8,290,634 B2 | 10/2012 | Larsen et al. |
| 8,332,076 B2 | 12/2012 | Fischle et al. |
| 8,355,825 B2 | 1/2013 | Sádaba et al. |
| 9,257,845 B2 | 2/2016 | Sadaba et al. |
| 9,347,429 B2 * | 5/2016 | Nielsen .................... F03D 7/00 |
| 9,348,324 B2 * | 5/2016 | Garcia ................... H02J 3/1878 |
| 9,407,186 B2 * | 8/2016 | Babazadeh ............... H02P 9/02 |
| 2013/0162043 A1 * | 6/2013 | Ellena ....................... H02J 3/38 |
| | | 307/43 |
| 2013/0234523 A1 | 9/2013 | Anichkov et al. |
| 2015/0088326 A1 | 3/2015 | Fortmann |
| 2015/0295529 A1 * | 10/2015 | Rose, Jr. ................ H02P 9/305 |
| | | 290/44 |
| 2017/0025858 A1 * | 1/2017 | Garcia .................... H02J 3/386 |
| 2017/0271877 A1 * | 9/2017 | Stewart ................... H02J 3/383 |

FOREIGN PATENT DOCUMENTS

| | | |
|---|---|---|
| WO | WO 2011/150932 A2 | 12/2011 |
| WO | WO 2012/028150 A2 | 3/2012 |

* cited by examiner

SYSTEM AND METHOD FOR BALANCING REACTIVE POWER LOADING BETWEEN RENEWABLE ENERGY POWER SYSTEMS

FIELD OF THE INVENTION

The present invention relates generally to the field of renewable energy power systems, and more particularly to systems and methods for balancing reactive power loading between a plurality of renewable energy power systems coupled to a power grid at a point of regulation while also regulating voltage.

BACKGROUND OF THE INVENTION

Typically, an electric power system includes a plurality of power generation assets, which are spread over a geographic area. The electric power system also includes systems that consume power (loads) that may also be spread over the geographic area. The electric power system generally includes a grid, a network of electric power lines and associated equipment used to transmit and distribute electricity over the geographic area. The infrastructure of the grid, may include, but is not limited to devices for interconnection, control, maintenance, and improvement of the electric power system operation. Typically, the electric power system includes a centralized control system operatively connected to the power generation assets for controlling a power output of each of the power generation assets, for example, using processing logic. The network operator usually operates the centralized control system. The power output of the power generation assets controlled by the centralized control system may include, but is not limited to, an amount of electrical power, and/or a voltage for the electrical power.

The power generation assets include individual power generating stations. For example, the power generating stations may each serve a geographic region within the grid by delivering electrical power to such regions. The power generation assets may include any type of power source that generates electrical power at least partially from coal, water, a combustible fluid such as gasoline, natural gas, diesel fuel, etc., nuclear, wind, and/or solar energy.

For economic reasons and as one of the approaches to reduce the environmental impacts of fossil fuel power generation, renewable energy plants, such as wind farms having a larger power output, are being produced and wind farms with greater numbers of wind turbine generators are being brought into operation. The power output from the wind farms in the future may comprise a significantly larger part of the total power being supplied and transmitted along the transmission grid. At the same time, there is increasing concern about the transmission capacity available for new large-scale wind farms, and the stability issues limiting transmission capacity.

Wind energy is often used to generate electrical power at power plants via a plurality of wind turbines often referred to as wind farms, using, for example, the rotation of the wind turbines to drive electrical generators. Wind farms and their associated farm controllers can control reactive power supply, and to a more limited extent active power. For example, U.S. Pat. No. 7,119,452, U.S. Pat. No. 7,166,928, and U.S. Pat. No. 7,224,081 each describes voltage control for wind generators including a farm-level controller with a reactive power command and a wind turbine generator control system. Wind turbine generator voltage control may be provided by regulating the voltage according to a reference set by a higher-than-generator-level (substation or farm level) controller. Reactive power may be regulated over a longer term (e.g. few seconds) while wind turbine generator terminal voltage is regulated over a shorter term (e.g. fraction of a second) to mitigate the effect of fast grid transients.

As the density of wind farms in a given area increases, either from a single developer, or multiple developers, the likelihood of regulator interaction will increase. Additionally, the regulations from the grid operators are evolving to require improved voltage regulation from such wind plants. As such, there is a growing need for adjacent wind plants to cooperate in their VAR production and absorption in order to maintain a suitable level of tolerance in the voltage control.

Accordingly, a system and method for coordinating control of multiple renewable energy plants, such as wind farms, on a common point of regulation on a power grid by balancing the reactive power production of each participating plant so as to ensure that the plant operations meet the regulatory requirements imposed upon them would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for balancing reactive power loading between a plurality of renewable energy power systems coupled to a power grid at a point of regulation while also regulating voltage. The method includes determining a voltage error as a function of a voltage reference and a measured voltage at the point of regulation. Another step includes measuring one or more actual operating conditions from each of the renewable energy power systems in real-time. As such, the method also includes determining a per unit actual reactive power for each of the renewable energy power systems based on at least one of the actual operating conditions. Further, the method includes determining a per unit average reactive power from the plurality of renewable energy power systems based on at least one of the actual operating conditions. Thus, the method also includes determining a voltage reference command for each of the plurality of renewable energy power systems as a function of the voltage error, the per unit reactive power, and/or the per unit average reactive power.

In one embodiment, the actual operating condition(s) may include any one of or a combination of the following: an absolute actual reactive power production for each of the renewable energy power systems, a per unit reactive power production for each of the renewable energy power systems, positive reactive power capability, negative reactive power capability, Supervisory Control And Data Acquisition (SCADA) data, a current state of each of the controllers of the renewable energy power systems (e.g. active master controller, standby master controller, or secondary controller), voltage, or current. For example, in certain embodiments, the method may include determining the per unit average reactive power for each of the renewable energy power systems as a function of at least the per unit reactive power production. Further, in particular embodiments, the method may include determining the per unit actual reactive power for each of the renewable energy power systems as a function of the absolute actual reactive power production, the positive reactive power capability, and/or the negative reactive power capability.

In another embodiment, the step of determining the voltage reference command for each of the plurality of renewable energy power systems as a function of at least one of the voltage error, the per unit actual reactive power, or the average reactive power may include determining a difference between the per unit average reactive power from the per unit actual reactive power and subtracting the difference from the voltage error to obtain a voltage output.

In further embodiments, the method may also include applying a gain to at least one of the voltage error or the difference between the per unit average reactive power from the per unit actual reactive power. In additional embodiments, the method may include applying at least one of a proportional gain, lead lag control, or an integrator to the voltage output.

In yet another embodiment, the method may include selecting one of the controllers of one of the renewable energy power systems to be an active master controller. Thus, in such embodiments, the method may include sending or transmitting the voltage reference command for each of the renewable energy power systems to their respective controllers (or reactive power compensation devices) via the active master controller. In addition, the method may include selecting at least one of the remaining controllers of one of the renewable energy power systems to be a standby master controller. As such, the method may also include automatically selecting the standby master controller to maintain control if the active master controller encounters an error or failure.

In still a further embodiment, the method may include determining the voltage reference based on at least one of a set point demand from the power grid or a VAR regulator operating in either reactive power control or power factor control mode. In such embodiments, the set point demand from the power grid may include at least one of a voltage set point, a reactive power set point, or a power factor set point from the power grid.

In particular embodiments, the plurality of renewable energy power systems may include a plurality of wind farms, a plurality of solar power plants, or any other suitable renewable energy power systems.

In another aspect, the present disclosure is directed to a system for balancing reactive power loading between a plurality of wind farms coupled to a power grid at a point of regulation. The system includes one or more sensors configured to measure one or more actual operating conditions from each of the wind farms in real-time and at least one controller communicatively coupled to the one or more sensors. The controller is configured to perform one or more operations, including but not limited to determining a voltage error as a function of a voltage reference and a measured voltage at the point of regulation, determining a per unit actual reactive power for each of the renewable energy power systems based on at least one of the actual operating conditions, determining a per unit average reactive power from the plurality of renewable energy power systems based on at least one of the actual operating conditions, determining a reactive power reference command for each of the plurality of renewable energy power systems as a function of at least one of the voltage error, the per unit reactive power, and/or the per unit average reactive power. It should be understood that the system may further include any of the additional features and/or may be further configured to perform any of the additional method steps as described herein.

In yet another aspect, the present disclosure is directed to a method for determining a reference command for a plurality of renewable energy power systems coupled to a power grid at a point of regulation. The method includes determining a voltage error as a function of a voltage reference and a measured voltage at the point of regulation. The method also includes measuring one or more actual operating conditions from each of the renewable energy power systems in real-time. Further, the method includes determining a per unit actual reactive power for each of the renewable energy power systems based on at least one of the actual operating conditions. The method also includes determining a per unit average reactive power from the plurality of renewable energy power systems based on at least one of the actual operating conditions. Thus, the method includes determining the reference command for each of the plurality of renewable energy power systems as a function of the voltage error and at least one of the per unit actual reactive power or the per unit average reactive power, wherein the reference command balances a reactive power loading between each renewable energy power systems while also regulating voltage. It should be understood that the method may further include any of the additional features and/or method steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed to a system and method for controlling the voltage, reactive power, and/or power factor of multiple renewable energy power systems on a common point of regulation on a power grid by balancing the reactive power production of the participating power systems. More specifically, the multi-plant coordination actively coordinates the reactive power response of two and more renewable energy power system controllers in order to balance the reactive power loading of each power system while regulating the voltage, reactive power, or power factor at a single location on the grid upstream of the participating wind farms. Thus, the present disclosure can eliminate uneven VAR production between power systems, and in extreme cases, prevent two plants from trying to drive VARs in opposite directions to their respective plant limits in steady-state. Further, the present disclosure simplifies operations by providing the operator with a single set point for controlling the voltage of an upstream bus.

The present disclosure provides many advantages not present in the prior art. For example, active voltage coordination provides better performance compared to the passive scheme (i.e. voltage droop) especially for a high number of coupled power systems. Further, the present disclosure reduces the effort for grid studies and tuning of coupled power systems. In addition, the present disclosure can maintain a voltage threshold that does not require curtailment of the power systems at high power levels. Moreover, the present disclosure provides a multi-master architecture having a higher redundancy with improved and more stable operation in case of an outage of one or more of the power systems.

Though the present disclosure is generally described herein with reference to a plurality of wind farms, it should be understood that the present technology can be applied to any suitable renewable energy power systems, in addition to wind farms, such as solar or photovoltaic power plants, hydropower plants, geothermal energy plants, bioenergy plants, or any other renewable energy power systems.

Figure 1:
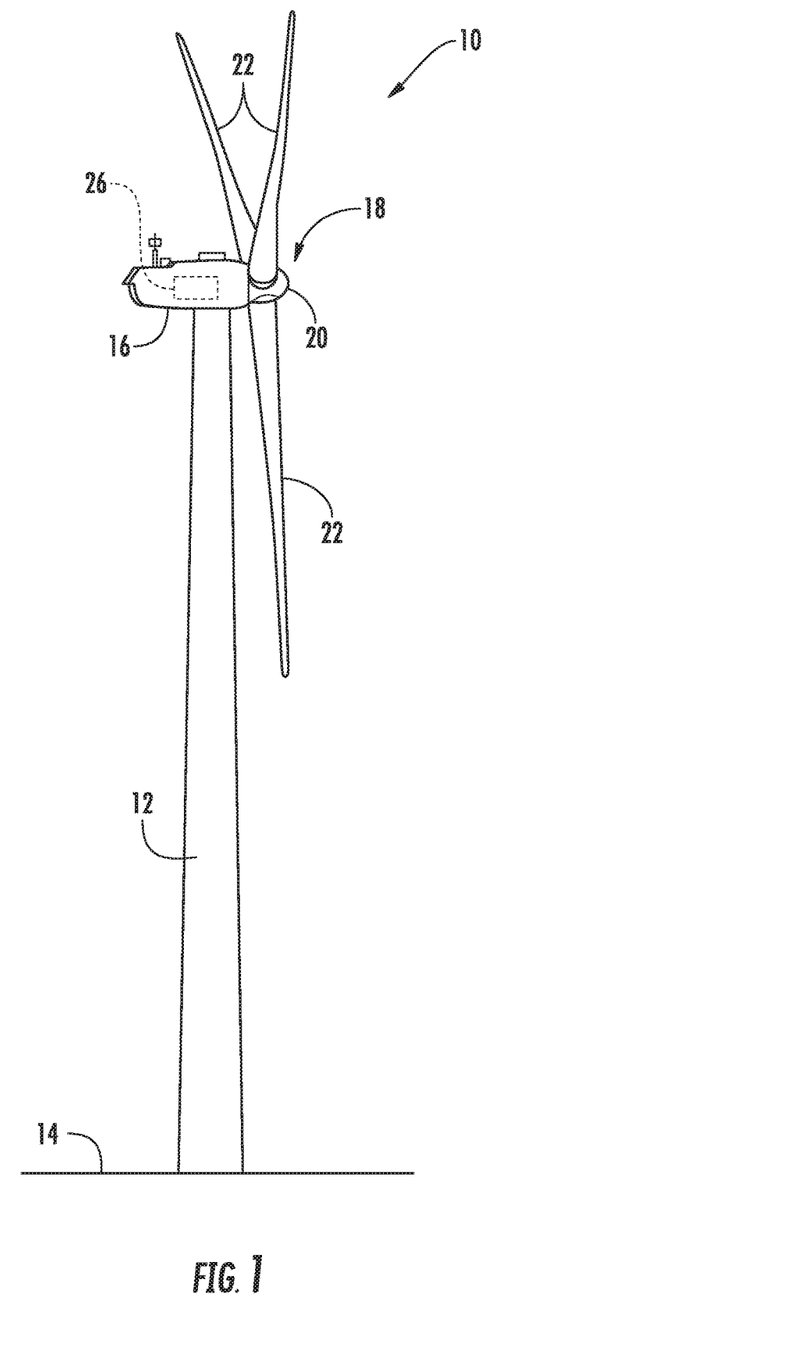
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10.

Figure 2:
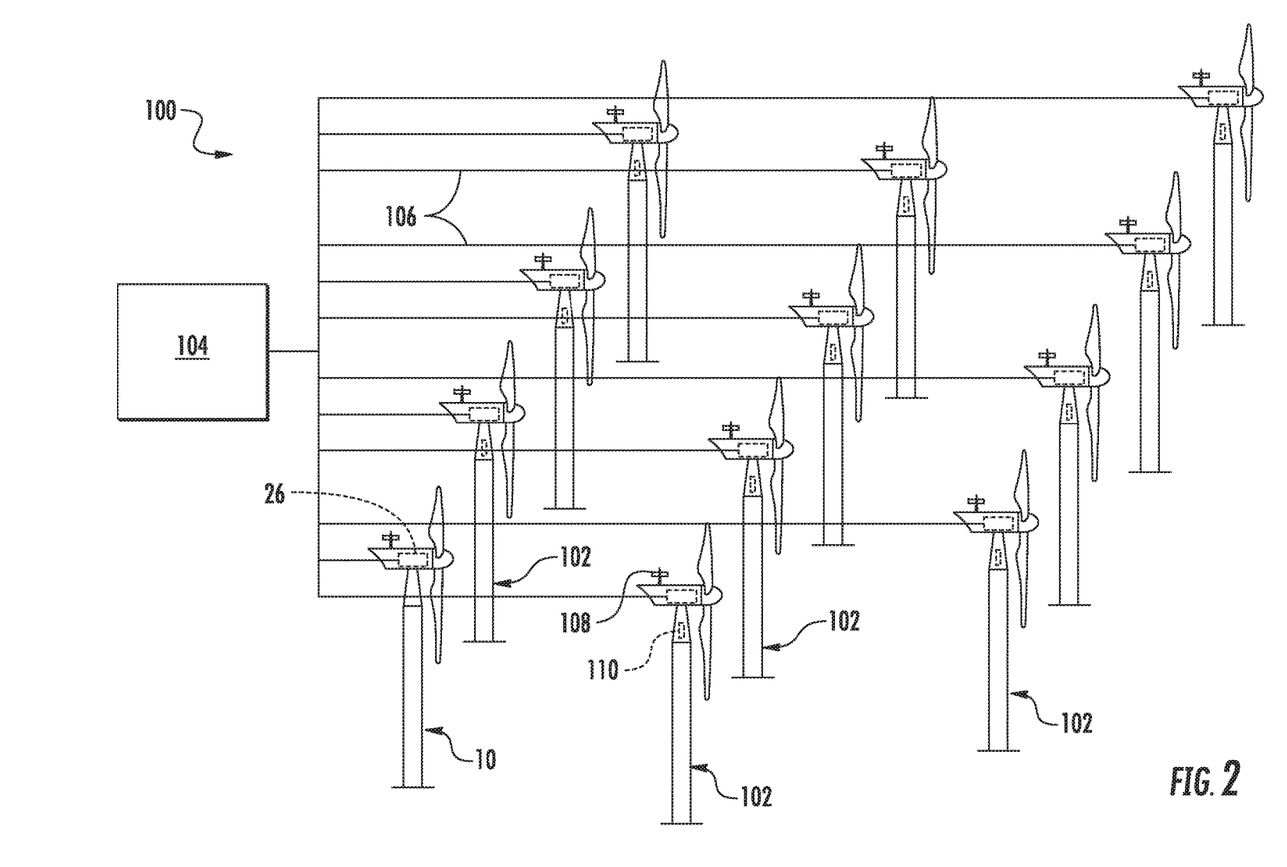
FIG. 2 illustrates a schematic view of one embodiment of a wind farm having a plurality of wind turbines according to the present disclosure.

Referring now to FIG. 2, a wind farm 100 controlled according to the system and method of the present disclosure is illustrated. As shown, the wind farm 100 may include a plurality of wind turbines 102, including the wind turbine 10 described above, and a farm controller 104. For example, as shown in the illustrated embodiment, the wind farm 100 includes twelve wind turbines 102, including wind turbine 10. However, in other embodiments, the wind farm 100 may include any other number of wind turbines 102, such as less than twelve wind turbines or greater than twelve wind turbines. In one embodiment, the controller 26 of the wind turbine 10 may be communicatively coupled to the farm controller 104 through a wired connection, such as by connecting the controller 26 through suitable communicative links 106 (e.g., a suitable cable). Alternatively, the controller 26 may be communicatively coupled to the farm controller 104 through a wireless connection, such as by using any suitable wireless communications protocol known in the art. In addition, the farm controller 104 may be generally configured similar to the controllers 26 for each of the individual wind turbines 102 within the wind farm 100.

In several embodiments, one or more of the wind turbines 102 in the wind farm 100 may include a plurality of sensors for monitoring various operational data of the individual wind turbines 102 and/or one or more wind parameters of the wind farm 100. For example, as shown, each of the wind turbines 102 includes a wind sensor 108, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 100. Thus, the wind sensor(s) 108 may allow for the local wind speed at each wind turbine 102 to be monitored. In addition, the wind turbine 102 may also include one or more additional sensors 110. For instance, the sensors 110 may be configured to monitor electrical properties of the output of the generator of each wind turbine 102, such as current sensors, voltage sensors, temperature sensors, or power sensors that monitor power output directly based on current and voltage measurements. Alternatively, the sensors 110 may include any other sensors that may be utilized to monitor the power output of a wind turbine 102. It should also be understood that the wind turbines 102 in the wind farm 100 may include any other suitable sensor known in the art for measuring and/or monitoring wind parameters and/or wind turbine operational data.

Figure 3:
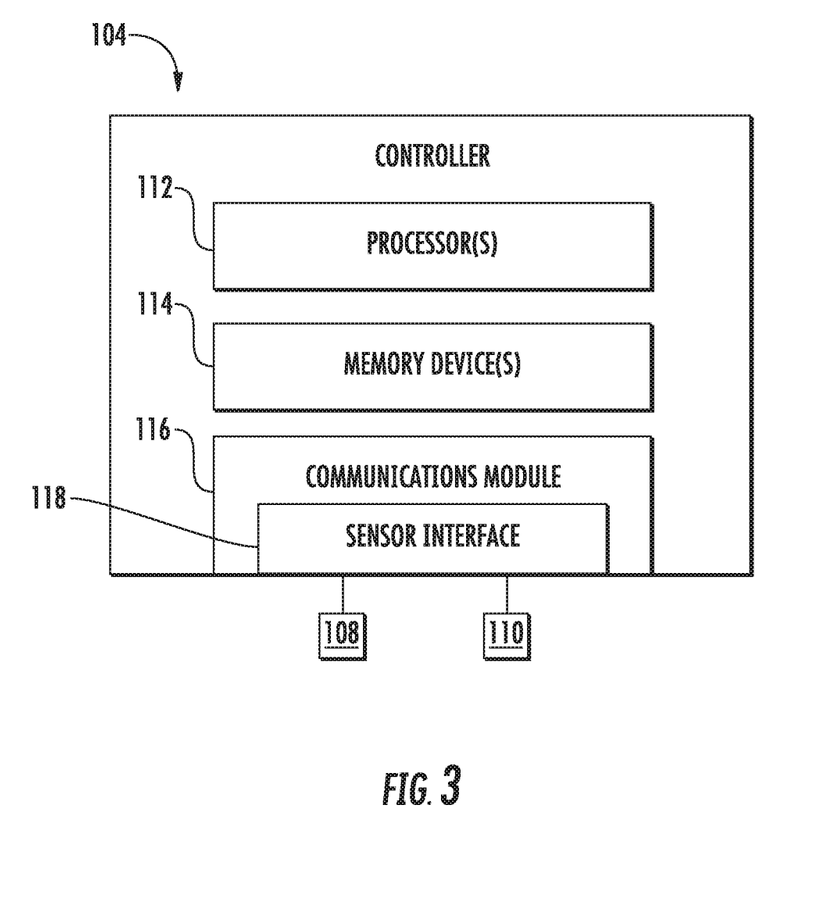
FIG. 3 illustrates a schematic view of one embodiment of a farm controller for use with the wind farm shown in FIG. 2.

Referring now to FIG. 3, a block diagram of one embodiment of suitable components that may be included within the farm controller 104 (or turbine controller 26) is illustrated in accordance with aspects of the present disclosure. As shown, the farm controller 104 may include one or more processor(s) 112 and associated memory device(s) 114 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 114 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the farm controller 104 may also include a communications module 116 to facilitate communications between the farm controller 104 and the wind turbines 102 in the wind farm 100. For instance, the communications module 116 may include a sensor interface 118 (e.g., one or more analog-to-digital converters) to permit the signals transmitted by one or more 108, 110 to be converted into signals that can be understood and processed by the farm controller 104. Furthermore, it should be appreciated that the sensors 108, 110 may be communicatively coupled to the communications module 62 using any suitable means. For example, as shown, the sensors 108, 110 are coupled to the sensor interface 118 via a wired connection. However, in alternative embodiments, the sensors 108, 110 may be coupled to the sensor interface 118 via a wireless connection, such as by using any suitable wireless communications protocol known in the art. For example, the communications module 116 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 112 may be configured to receive one or more signals from the sensors 108, 110.

It should also be understood that any number or type of sensors may be employed and at any location. For example, the sensors 108, 110 may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbines 102 may be configured to provide a direct measurement of the parameters being monitored or an indirect measurement of such parameters. Thus, the sensors 108, 110 may, for example, be used to generate signals relating to the parameter being monitored, which can then be utilized by the farm controller 104 to determine the actual condition.

Figure 4:
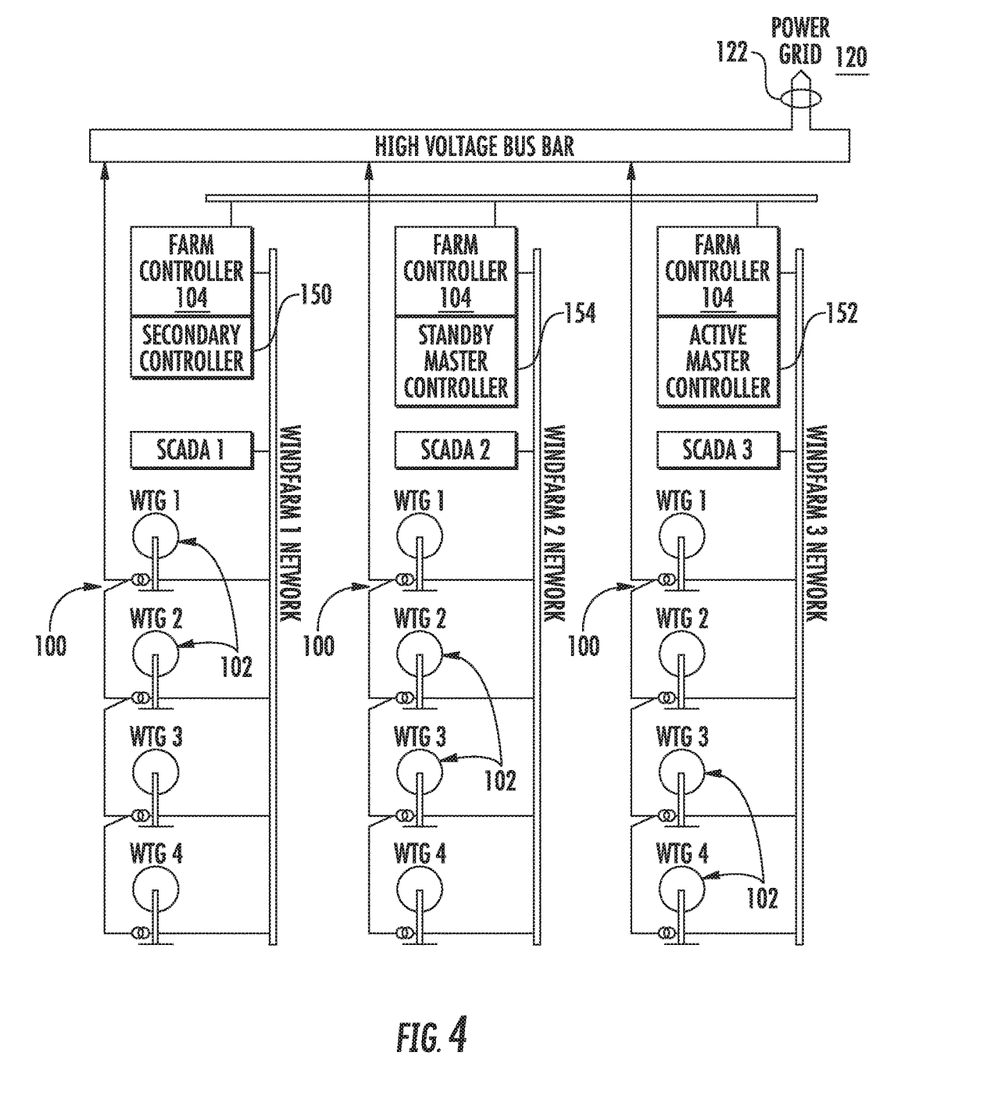
FIG. 4 illustrates a schematic view of one embodiment of a plurality of wind farms controlled via a master active controller by balancing reactive power loading between the wind farms while also regulating voltage according to the present disclosure.
Figure 5:
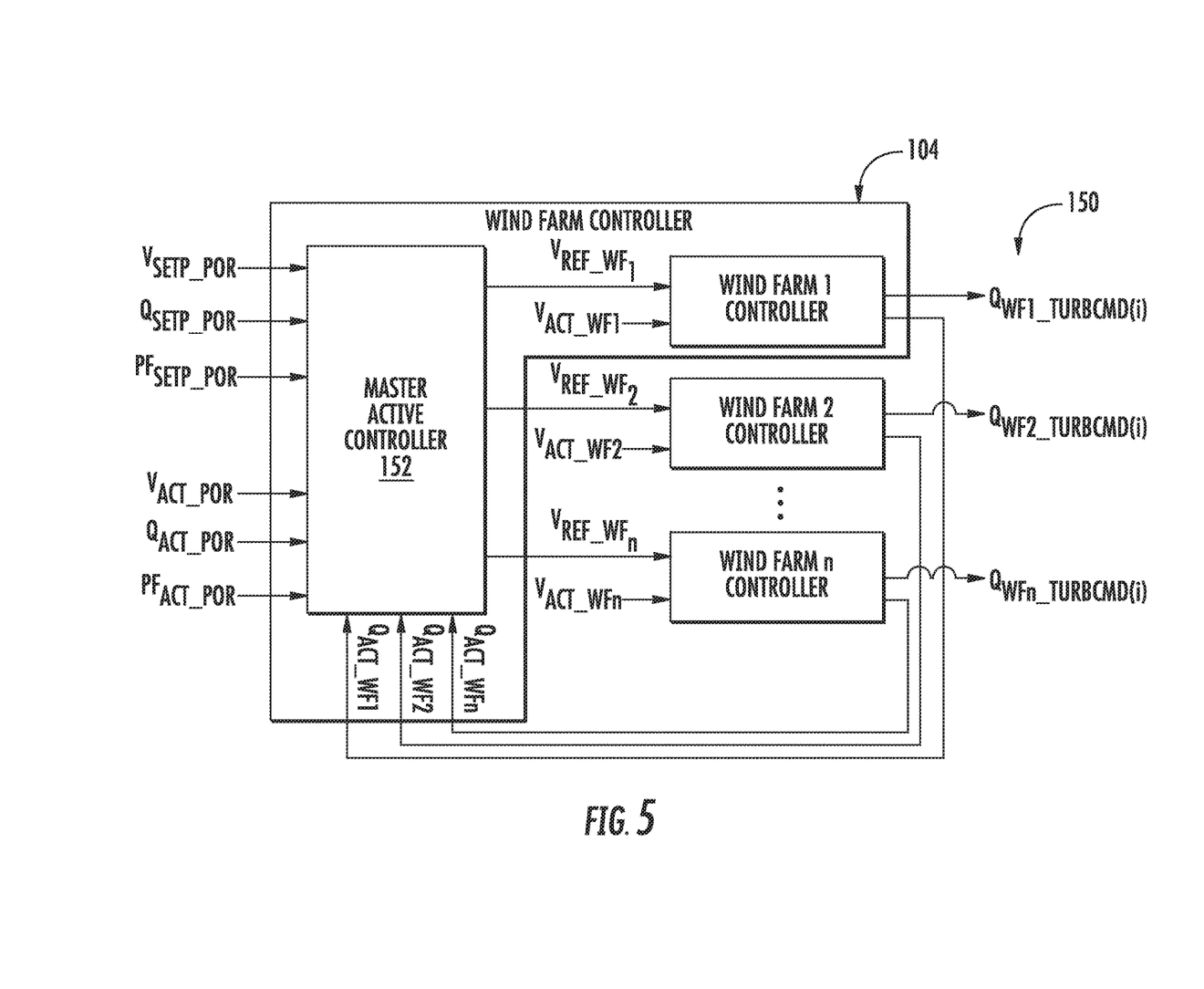
FIG. 5 illustrates a schematic view of one embodiment of a process flow diagram of a system for balancing reactive power loading between a plurality of wind farms while also regulating voltage according to the present disclosure.

Referring now to FIG. 4, a schematic diagram of a plurality of wind farms 100 coupled to a power grid 120 at a point of regulation (POR) 122 common to all of the wind farms 100 according to the present disclosure is illustrated. As mentioned above, each wind farm 100 includes a plurality of wind turbines 102, with each wind turbine 102 comprising a wind turbine generator (WTG) for producing electricity that can be supplied to the power grid 120. More specifically, as shown in FIG. 5, a system 150 for balancing reactive power loading between the plurality of wind farms 100 while also regulating voltage is further illustrated. As such, the present disclosure is configured to actively coordinate the reactive power response of two and more of the wind farms 100 in order to balance the reactive power loading of each wind farm 100 while regulating the voltage, reactive power, and/or power factor at a single location on the grid upstream of the participating wind farms 100. Thus, the present disclosure is configured to eliminate the uneven VAR production between the wind farms 100, and in extreme cases, prevent two farms 100 from trying to drive VARs in opposite directions to their respective plant limits in steady-state.

More specifically, FIG. 5 illustrates a simplified process flow diagram that depicts the interaction of a master active controller 152, which is part of a wind farm controller 104, with the remaining farm controllers 104 (i.e. wind farm 1 controller, wind farm 2 controller, wind farm n controller, and so on). For example, in one embodiment, one of the farm controllers 104 may be selected from the plurality of farm controllers of the wind farms 100 to be the active master controller 152. The remaining controllers may either be designated as a standby master controller 154 or a secondary controller 156 (FIG. 4). Thus, the present disclosure may include automatically selecting the standby master controller 154 to maintain control if the active master controller 152 encounters an error or fails. Such errors may include a loss of measurement, communication failure, and/or a loss of power supply. As such, the system 150 is setup as a multi-master system, wherein one master controller is acting and other potential master controllers are on standby to take over the master control if needed. Thus, immediately upon detection of an error/failure or that there is no active master controller, the wind farm control unit with the highest priority will take over the master controller role. A manual master selection of eligible wind farm control units is also supported by a human machine interface (HMI).

Referring still to FIG. 5, the active master controller 152 is configured to manage the reactive power contribution from each wind farm 100 by providing a unique voltage reference command (e.g. $V_{ref\_WF1}$, $V_{ref\_WF2}$, $V_{ref\_WFn}$) to each wind farm controller based on the voltage, VAR, or power factor measurements at the point of regulation 122 (e.g. $V_{Act\_POR}$, $Q_{Act\_POR}$, or $PF_{Act\_POR}$, respectively), the reported reactive power feedbacks from the individual wind farms 100 (e.g. $Q_{Act\_WF2}$, $Q_{Act\_WF2}$, and $Q_{Act\_WFn}$), and/or any one of the voltage, VAR, or power factor set points from the operator at the point of regulation 122 (e.g. $V_{SetpPOR}$, $Q_{set\_POR}$, or $PF_{Setp\_POR}$, respectively). Within each individual wind farm 100, reactive power commands (e.g. $Q_{WF1\_TurbCmd(i)}$, $Q_{WF2\_TurbCmd(i)}$, and $Q_{WFn\_TurbCmd(i)}$) are issued to each wind turbine 102 in the wind farm 100 such that the commands regulate the voltage at the wind farm interconnection bus to the voltage requested by the active master controller 152. For example, as shown in the illustrated embodiment, the individual wind farm controllers (i.e. wind farm 1 controller, wind farm 2 controller, wind farm n controller, and so on) are configured to determine the reactive power commands (e.g. $Q_{WF1\_TurboCmd(i)}$, $Q_{WF2\_TurbCmd(i)}$, and $Q_{WFn\_TurbCmd(i)}$) based on the voltage references (e.g. $V_{ref\_WF1}$, $V_{ref\_WF2}$, $V_{ref\_WFn}$) and the actual measured voltage (e.g. $V_{Act\_WF1}$, $V_{Act\_WF2}$, and $V_{Act\_WFn}$) at the point of regulation 122 for the wind farms 100.

Alternatively, the active master controller 152 may be configured to manage the reactive power contribution from each wind farm 100 by providing a unique reactive power reference command to each wind farm controller based on the voltage, VAR, or power factor measurements at the point of regulation 122, the reported voltage feedbacks from the individual wind farms 100, and/or any one of the voltage, VAR, or power factor set points from the operator at the point of regulation 122.

Figure 6:
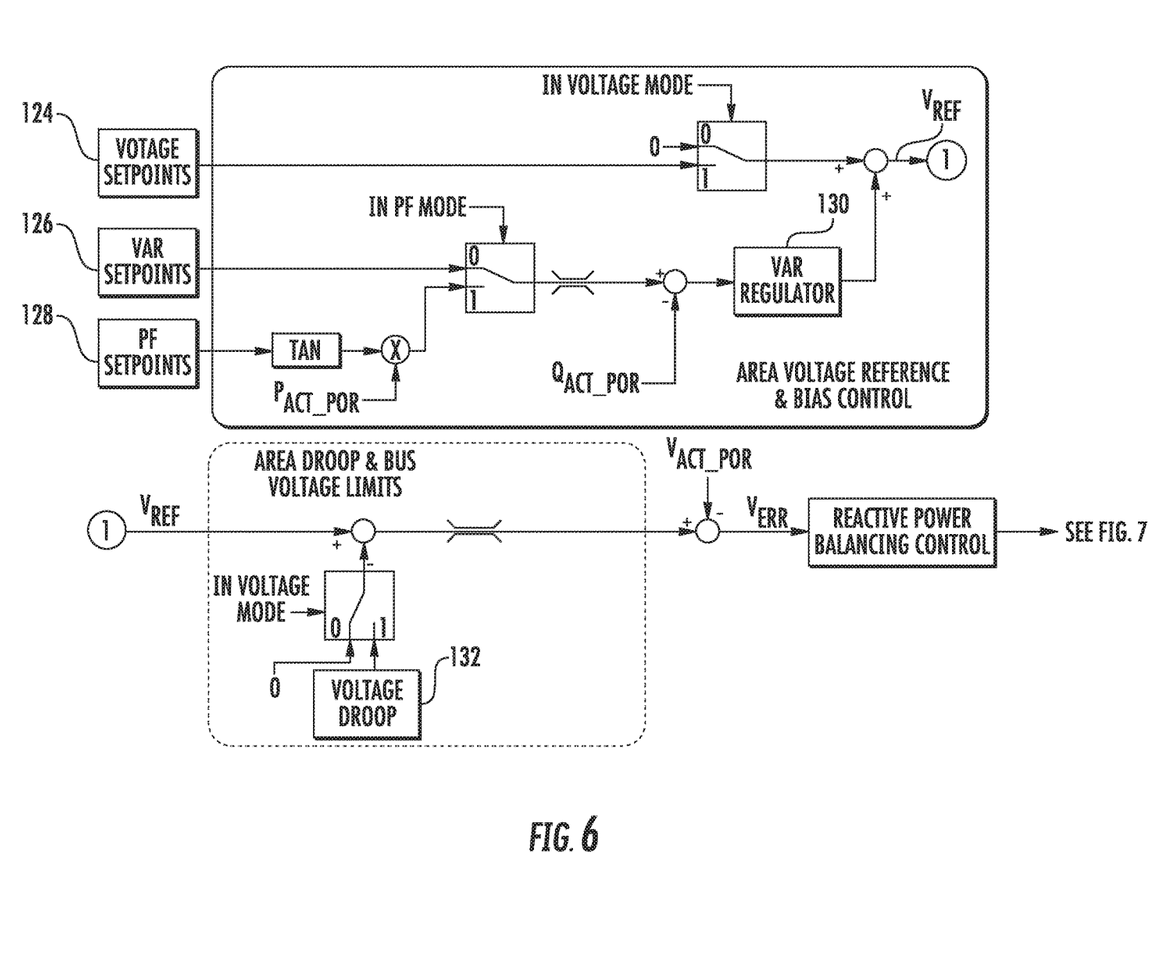
FIG. 6 illustrates a schematic view of one embodiment of a process flow diagram of a system for area voltage/VAR/power factor control according to the present disclosure.

Referring now to FIG. 6, the system 150 is also configured to determine a voltage error (e.g. $V_{err}$) as a function of a voltage reference (e.g. $V_{Ref}$) and/or a measured voltage at the point of regulation 122 (e.g. $V_{Act\_POR}$). For example, in one embodiment, the active master controller 152 is configured to determine the voltage reference $V_{Ref}$ based on at least one of a set point demand from the power grid 120 or an outer loop VAR regulator 130 operating in either reactive power control or power factor control mode. For example, as shown in the illustrated embodiment, the set point demand from the power grid 120 may include at least one of a voltage set point 124, a reactive power (VAR) set point 126, or a power factor (PF) set point 128 from the power grid 120.

Figure 7:
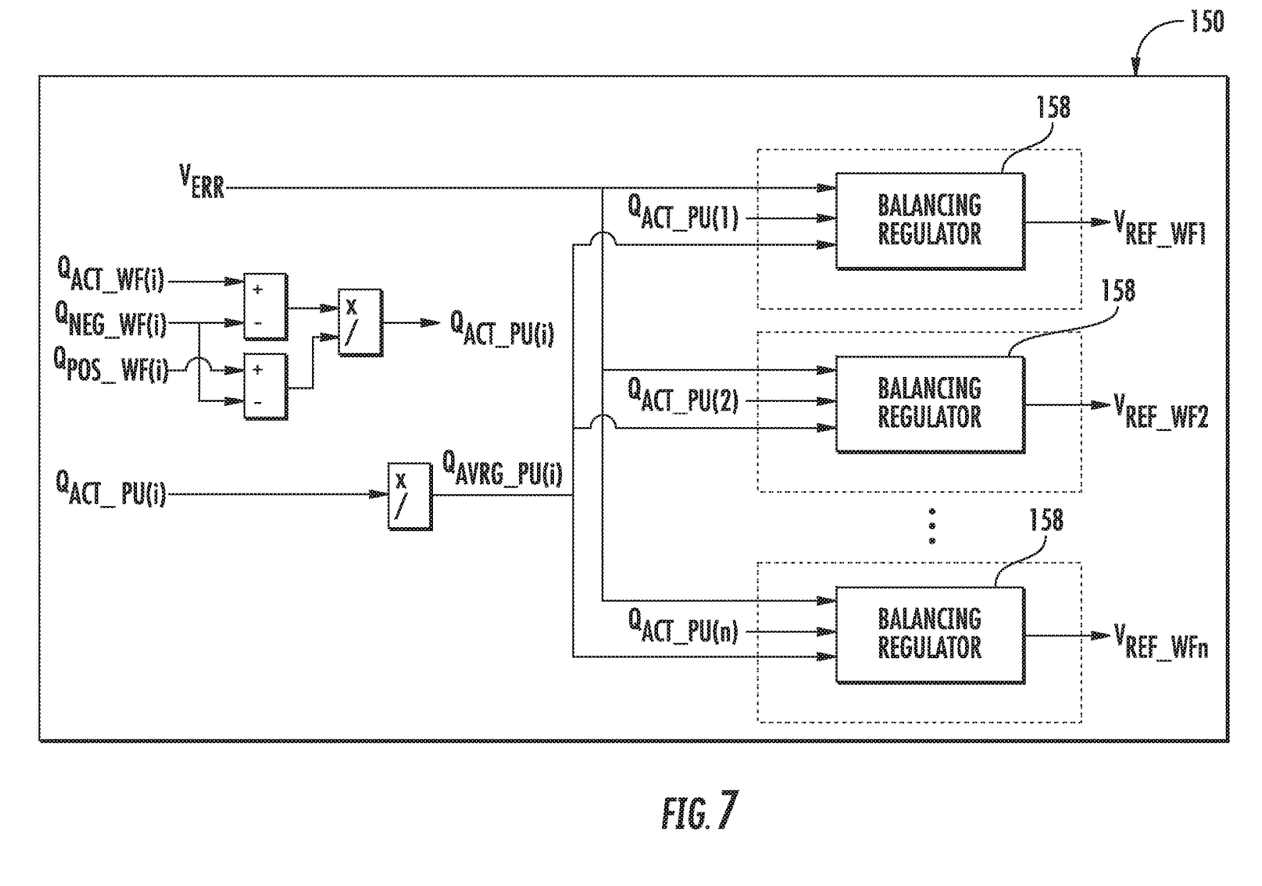
FIG. 7 illustrates a schematic view of one embodiment of a process flow diagram of a system for balancing reactive power loading between a plurality of wind farms while also regulating voltage according to the present disclosure.

Referring to FIGS. 6 and 7, in the inner loop, a reactive power balancing regulator 158 is acting on a voltage error $V_{err}$ and sending voltage reference commands $V_{Ref\_WF(i)}$, $V_{Ref\_WF1}$, $V_{Ref\_WF1}$, or $V_{Ref\_WFn}$ to the connected wind farm voltage controllers. Alternatively, the voltage reference commands may be sent to one or more reactive compensation devices, including but not limited to static synchronous compensators (STATCOMs), static VAR compensators (SVCs), thyristor-controlled reactors (TSCs), or synchronous condensers, in an area to regulate voltage at a common point of connection. Thus, the reactive power balancing regulator 158 can operate against a voltage reference from a voltage set point interface (e.g. hardwired, communication interface, SCADA). Further, the balancing regulator 158 can also receive a voltage reference from an outer loop VAR regulator 130. As such, the VAR regulator 130 is able to either follow a reactive power reference from a reactive power set point interface (e.g. hardwired, communication interface, SCADA) or follow a reactive power reference calculated from a power factor set point interface (e.g. hardwired, communication interface, SCADA). A voltage reference bias control option can also be activated to generate the voltage reference $V_{Ref}$ by combining the voltage reference from the voltage set point(s) 124 and the voltage reference as an output of the VAR regulator 130. In this operational mode, the VAR regulator 130 is correcting the voltage reference to center the VAR production of the system 150. This can be useful, when connecting the coupled wind farms of the control scheme to a close connected conventional power plant. Optionally, as shown in FIG. 6, the system 150 can be setup with voltage droop 132 to passively coordinate the voltage regulation of close connected generation wind farms outside the regulated wind farms 100.

Referring particularly to FIG. 7, the system 150 also includes measuring one or more actual operating conditions from each of the wind farms 100 in real-time. In one embodiment, the actual operating condition(s) may include any one of or a combination of the following: an absolute actual reactive power production for each of the renewable energy power systems, a per unit reactive power production for each of the renewable energy power systems, positive reactive power capability, negative reactive power capability, Supervisory Control And Data Acquisition (SCADA) data, a current state of each of the controllers of the renewable energy power systems, voltage, or current. As such, the system 150 is configured to determine a per unit average reactive power (e.g. $Q_{Avrg\_pu}$) from the plurality of wind farms 100 based on at least one of the actual operating conditions. For example, as shown in embodiment of FIG. 7, the system 150 is configured to determine the per unit average reactive power (e.g. $Q_{Avr\_pu}$) for each of the wind farms 100 as a function of, at least, the per unit reactive power production of an individual wind farm (e.g. $Q_{Act\_pu(i)}$). As used herein, "per unit" is a normalized unit less number. For example, for a rated park power $P_{Rated}$ of 100 MW and an actual park power $P_{Act}$ of 50 MW, the per unit actual power $P_{Act\_pu}$ is equal to $P_{Act}/P_{Rated}$ or 100 MW/50 MW, which is 0.5.

In addition, the system 150 is configured to determine a per unit actual reactive power (e.g. $Q_{Act\_pu(i)}$, $Q_{Act\_pu(1)}$, $Q_{Act\_pu(2)}$, or $Q_{Act\_pu(n)}$) for each of the wind farms 100 based on at least one of the actual operating conditions. More specifically, as shown in embodiment of FIG. 7, the system 150 is configured to determine the per unit actual reactive power (e.g. $Q_{Act\_pu(i)}$, $Q_{Act\_pu(1)}$, $Q_{Act\_pu(2)}$, or $Q_{Act\_pu(n)}$) for each of the wind farms 100 as a function of the absolute actual reactive power production (e.g. $Q_{Act\_WF(i)}$), the positive reactive power capability (e.g. $Q_{Pos\_WF(i)}$, and/or the negative reactive power capability (e.g. $Q_{Neg\_WF(i)}$).

Figure 8:
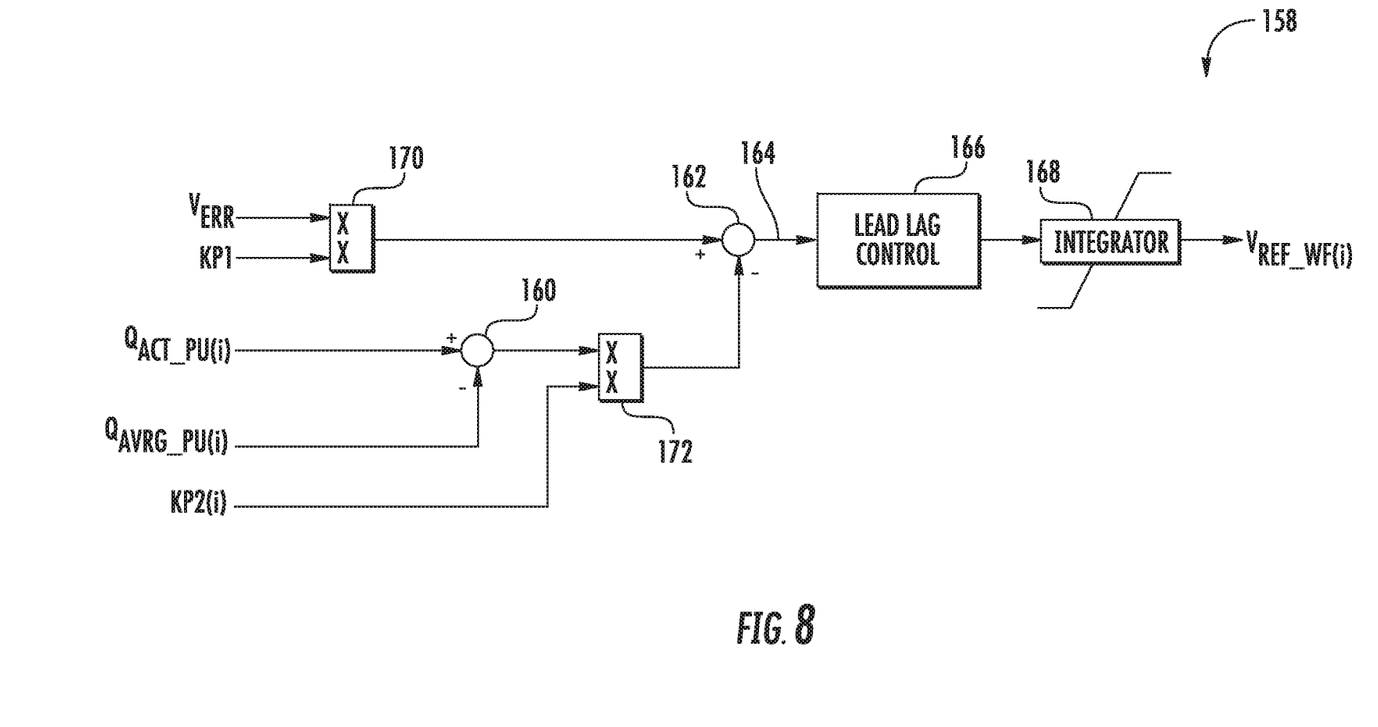
FIG. 8 illustrates a schematic view of one embodiment of a process flow diagram of a balancing regulator of a system for balancing reactive power loading between a plurality of wind farms while also regulating voltage according to the present disclosure.

Thus, as shown in FIG. 7, the system 150 is configured to determine, via the balancing regulators 158, a voltage reference command (e.g. $V_{Ref\_WF1}$, $V_{Ref\_WF2}$, or $V_{Ref\_Wfn}$) for each of the plurality of the wind farms 100 as a function of at least one of the voltage error $V_{err}$, the per unit actual reactive power (e.g. $Q_{Act\_pu(i)}$, $Q_{Act\_pu(1)}$, $Q_{Act\_pu(2)}$, or $Q_{Act\_pu(n)}$) for each of the wind farms 100, and/or the per unit average reactive power $Q_{Avrg\_pu}$. Based on the actual and average power productions, the voltage error on each wind farm balancing regulator 158 can be corrected to generate a wind farm voltage reference that balances the reactive power production of all plants in a steady state. In such embodiments, the active master controller 152 is configured to send the unique voltage reference commands to each of the farm controllers 104 of the wind farms 100. More specifically, as shown in FIG. 8 at 160, the active master controller 152 may be configured to determine a difference between the per unit average reactive power $Q_{Avrg\_pu}$ for the plurality of wind farms 100 and the per unit actual reactive power (e.g. $Q_{Act\_pu(i)}$, $Q_{Act\_pu(1)}$, $Q_{Act\_pu(2)}$, or $Q_{Act\_pu(n)}$). Further, as shown at 162, the active master controller 152 is configured to subtract the difference between the per unit average reactive power and the per unit actual reactive power from the voltage error $V_{en}$ to obtain a voltage output 164.

Referring now to FIG. 8, individual proportional gains, the time constant for the lead lag, and/or the integral gain can be setup for each wind farm 100 based on the wind farm characteristic and impedance into the grid 120. More specifically, as shown, the active master controller 152 may also include a lead lag control 166 and/or an integrator 168. As such, the voltage output 164 may be sent through the lead lag control 166 and/or an integrator 168 to obtain the voltage reference command (e.g. $V_{Ref\_WF(i)}$, $V_{Ref\_WF1}$, $V_{Ref\_WF2}$, or $V_{Ref\_WFn}$). Still referring to FIG. 8, the active master controller 152 may also be configured to apply a proportional gain (e.g. $Kp_1$, $Kp_{2(i)}$) to at least one of the voltage error $V_{err}$ (as shown at 170) or to the difference between the per unit average reactive power $Q_{Avrg\_pu(i)}$ from the per unit actual reactive power $Q_{Act\_pu(i)}$ as shown at 172.

Figure 9:
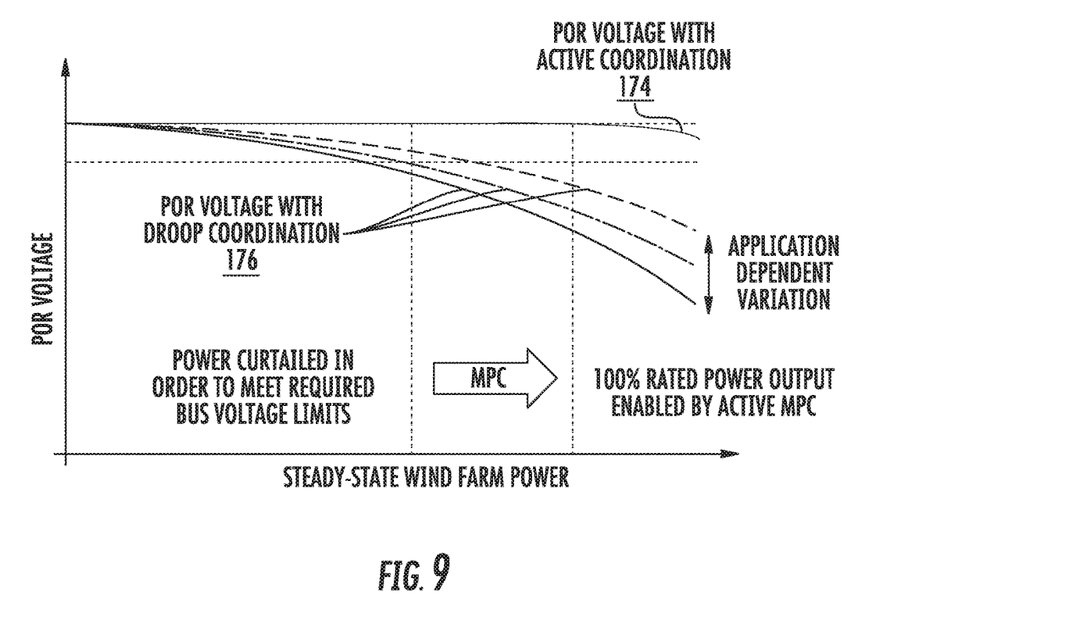
FIG. 9 illustrates a power-voltage graph of a generalized renewable energy power system, with the steady-state wind farm power plotted on the x-axis versus the POR voltage plotted on the y-axis according to the present disclosure; and, FIG. 10 illustrates a flow diagram of one embodiment of a method for balancing reactive power loading between a plurality of wind farms while also regulating voltage according to the present disclosure.

Further advantages of the present disclosure can be better understood with reference to FIG. 9. As shown, a power-voltage graph of a generalized renewable energy power system is illustrated. More specifically, as shown, the steady-state wind farm power (x-axis) versus the POR voltage (y-axis) for the renewable energy power system is provided. As shown in regards to curve 174, the system 150 assists the wind farm controllers in delivering the greatest benefit to the grid 120 while maximizing the power transfer capability of the power system. In contrast, for a grid without the present disclosure (as represented by curves 176), the voltages in the transmission system drop as a function of power transfer as shown by the purple lines in the figure below. Further, for high power transfers, such voltages may drop below minimums required by the system operator, leading to curtailment of wind power. As such, the system 150 of the present disclosure enables multiple wind farms 100 to regulate the voltage in the transmission system, which can help avoid curtailment by increasing the power transfer capability of the transmission system.

Figure 10:
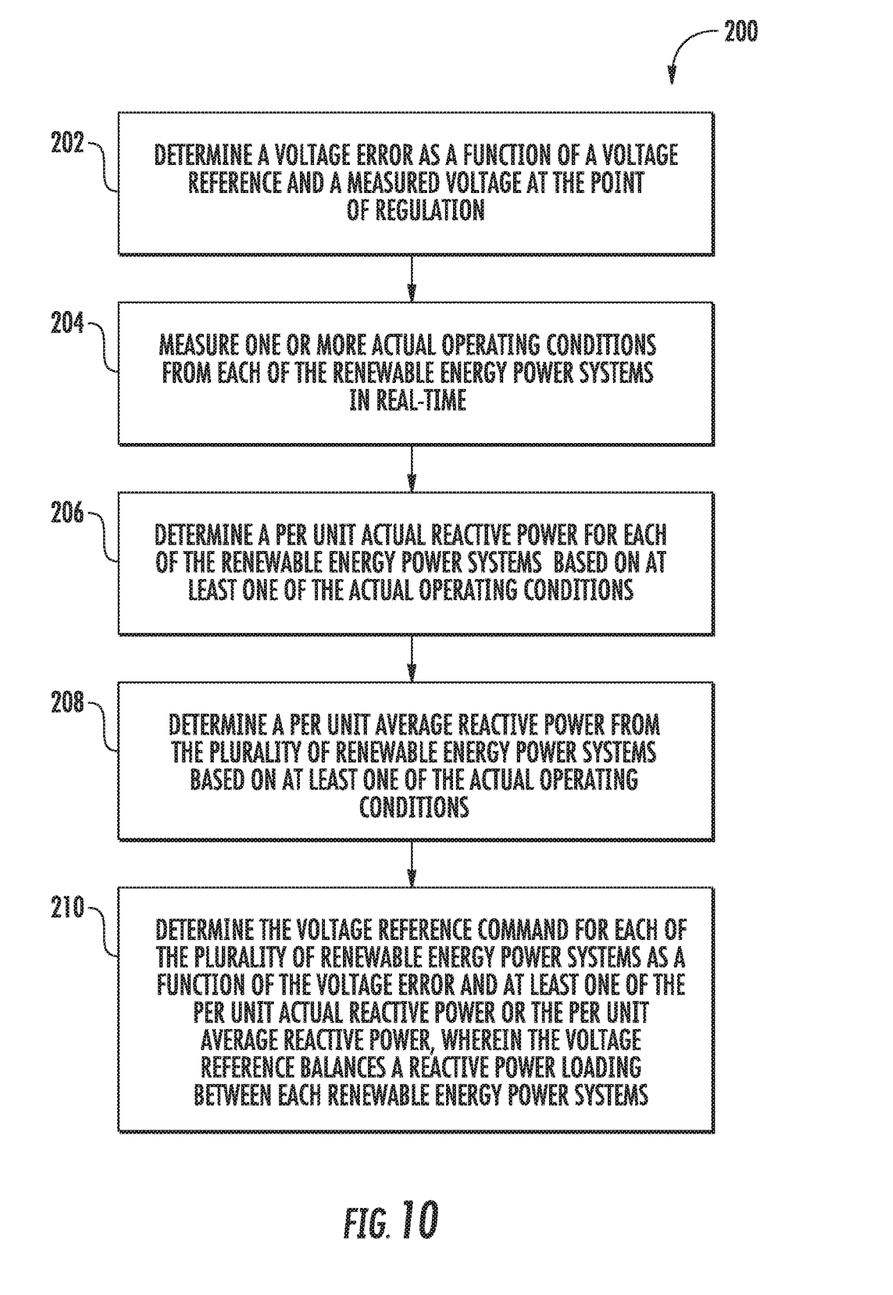

Referring now to FIG. 10, a flow diagram of one embodiment of a method 200 for determining a voltage reference command for a plurality of renewable energy power systems coupled to a power grid 120 at a point of regulation 122 is illustrated. As shown at 202, the method 200 includes determining a voltage error as a function of a voltage reference and a measured voltage at the point of regulation. As shown at 204, the method 200 includes measuring one or more actual operating conditions from each of the renewable energy power systems in real-time. As shown at 206, the method 200 includes determining a per unit actual reactive power for each of the renewable energy power systems based on at least one of the actual operating conditions. As shown at 208, the method 200 includes determining a per unit average reactive power from the plurality of renewable energy power systems based on at least one of the actual operating conditions. As shown at 210, the method 200 includes determining the voltage reference for each of the plurality of renewable energy power systems as a function of the voltage error and at least one of the per unit actual reactive power or the per unit average reactive power, wherein the voltage reference balances a reactive power loading between each renewable energy power systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for balancing reactive power loading between a plurality of renewable energy power systems coupled to a power grid at a point of regulation while also regulating voltage, the method comprising:
determining a voltage error as a function of a voltage reference and a measured voltage at the point of regulation;
measuring one or more actual operating conditions from each of the renewable energy power systems in real-time;
determining a per unit actual reactive power for each of the renewable energy power systems based on at least one of the actual operating conditions;
determining a per unit average reactive power from the plurality of renewable energy power systems based on at least one of the actual operating conditions; and,
determining a voltage reference command for each of the plurality of renewable energy power systems as a function of at least one of the voltage error, the per unit reactive power, or the per unit average reactive power.

2. The method of claim 1, wherein the actual operating conditions comprises at least one of an absolute actual reactive power production for each of the renewable energy power systems, a per unit reactive power production for each of the renewable energy power systems, positive reactive power capability, negative reactive power capability, Supervisory Control And Data Acquisition (SCADA) data, a current state of each of the controllers of the renewable energy power systems, voltage, or current.

3. The method of claim 2, further comprising determining the per unit average reactive power for each of the renewable energy power systems as a function of at least the per unit reactive power production.

4. The method of claim 2, further comprising determining the per unit actual reactive power for each of the renewable energy power systems as a function of at least one of the absolute actual reactive power production, the positive reactive power capability, or the negative reactive power capability.

5. The method of claim 1, wherein determining the voltage reference command for each of the plurality of renewable energy power systems as a function of at least one of the voltage error, the per unit actual reactive power, or the average reactive power further comprises:
determining a difference between the per unit average reactive power from the per unit actual reactive power; and,
subtracting the difference from the voltage error to obtain a voltage output.

6. The method of claim 5, further comprising applying a gain to at least one of the voltage error or the difference between the per unit average reactive power from the per unit actual reactive power.

7. The method of claim 5, further comprising applying at least one of a proportional gain, lead lag control, or an integrator to the voltage output.

8. The method of claim 1, further comprising selecting one of the controllers of one of the renewable energy power systems to be an active master controller.

9. The method of claim 8, further comprising sending the voltage reference command for each of the renewable energy power systems to at least one of their respective controllers or one or more reactive compensation devices via the active master controller.

10. The method of claim 8, further comprising selecting at least one of the remaining controllers of one of the renewable energy power systems to be a standby master controller, and automatically selecting the standby master controller to maintain control if the active master controller fails.

11. The method of claim 1, further comprising determining the voltage reference based on at least one of a set point demand from the power grid or an outer loop VAR regulator operating in either reactive power control or power factor control mode.

12. The method of claim 11, wherein the set point demand from the power grid comprises at least one of a voltage set point, a reactive power set point, or a power factor set point from the power grid.

13. The method of claim 1, wherein the plurality of renewable energy power systems comprise at least one of a plurality of wind farms or a plurality of solar power plants.

14. A system for balancing reactive power loading between a plurality of wind farms coupled to a power grid at a point of regulation, the system comprising:
one or more sensors configured to measure one or more actual operating conditions from each of the wind farms in real-time;
at least one controller communicatively coupled to the one or more sensors, the controller configured to perform one or more operations, the one or more operations comprising:
determining a voltage error as a function of a voltage reference and a measured voltage at the point of regulation;
determining a per unit actual reactive power for each of the renewable energy power systems based on at least one of the actual operating conditions;
determining a per unit average reactive power from the plurality of renewable energy power systems based on at least one of the actual operating conditions; and,
determining a reactive power reference command for each of the plurality of renewable energy power systems as a function of at least one of the voltage error, the per unit reactive power, or the per unit average reactive power.

15. The system of claim 14, wherein the actual operating conditions comprises at least one of an absolute actual reactive power production for each of the renewable energy power systems, a per unit reactive power production for each of the renewable energy power systems, positive reactive power capability, negative reactive power capability, Supervisory Control And Data Acquisition (SCADA) data, a current state of each of the controllers of the renewable energy power systems, voltage, or current.

16. The system of claim 15, further comprising determining the per unit average reactive power for each of the renewable energy power systems as a function of at least the per unit reactive power production.

17. The system of claim 15, further comprising determining the per unit actual reactive power for each of the renewable energy power systems as a function of at least one of the absolute actual reactive power production, the positive reactive power capability, or the negative reactive power capability.

18. The system of claim 14, wherein determining the reactive power reference command for each of the plurality of renewable energy power systems as a function of at least one of the voltage error, the per unit reactive power, or the average reactive power further comprises:
applying a gain to at least one of the voltage error;
determining a difference between the per unit average reactive power from the per unit actual reactive power;
applying a gain to the difference between the per unit average reactive power from the per unit actual reactive power;
subtracting the difference from the voltage error to obtain a voltage output; and,
applying at least one of lead lag control or an integrator to the voltage output.

19. The system of claim 14, wherein the one or more operations further comprise: selecting one of the controllers of one of the renewable energy power systems to be an active master controller; sending the reactive power reference command for each of the renewable energy power systems to at least one of their respective controllers or one or more reactive compensation devices via the active master controller; selecting at least one of the remaining controllers of one of the renewable energy power systems to be a standby master controller; and, automatically selecting the standby master controller to maintain control if the active master controller fails.

20. A method for determining a reference command for a plurality of renewable energy power systems coupled to a power grid at a point of regulation, the method comprising:
determining a voltage error as a function of a voltage reference and a measured voltage at the point of regulation;
measuring one or more actual operating conditions from each of the renewable energy power systems in real-time;
determining a per unit actual reactive power for each of the renewable energy power systems based on at least one of the actual operating conditions;
determining a per unit average reactive power from the plurality of renewable energy power systems based on at least one of the actual operating conditions; and,
determining the reference command for each of the plurality of renewable energy power systems as a function of the voltage error and at least one of the per unit actual reactive power or the per unit average reactive power, wherein the reference command balances a reactive power loading between each renewable energy power systems while also regulating voltage.

* * * * *